(12) United States Patent  
Amedi et al.

(10) Patent No.: US 12,699,456 B2  
(45) Date of Patent: Aug. 4, 2026

(54) TACTILE REPRESENTATION OF LOCATION CHARACTERISTICS AND CONTENT IN 3D

(71) Applicant: Amir Amedi, Modiin-Macabim-Reut (IL)

(72) Inventors: Amir Amedi, Modiin-Macabim-Reut (IL); Adi Snir, Tel Aviv (IL); Iddo Wald, Tel Aviv (IL); Katarzyna Ciesla, Tel Aviv (IL)

( * ) Notice: Subject to any disclaimer, the term of this patent is extended or adjusted under 35 U.S.C. 154(b) by 76 days.

(21) Appl. No.: 18/712,795

(22) PCT Filed: Nov. 25, 2022

(86) PCT No.: PCT/IL2022/051258  
§ 371 (c)(1),  
(2) Date: May 23, 2024

(87) PCT Pub. No.: WO2023/095141  
PCT Pub. Date: Jun. 1, 2023

(65) Prior Publication Data  
US 2024/0419252 A1 Dec. 19, 2024

Related U.S. Application Data

(60) Provisional application No. 63/283,236, filed on Nov. 25, 2021.

(51) Int. Cl.  
*H04B 3/36* (2006.01)  
*G06F 3/01* (2006.01)

(52) U.S. Cl.  
CPC .................................. *G06F 3/016* (2013.01)

(58) Field of Classification Search  
CPC ....... G06F 3/016; G06F 3/167; G09B 21/009; G08B 6/00  
See application file for complete search history.

(56) References Cited

U.S. PATENT DOCUMENTS 9,646,514 B2 * 5/2017 Rizzo ....................... A61H 3/04  
10,916,107 B1 * 2/2021 Urzhumov ................ B06B 1/06  
(Continued)

FOREIGN PATENT DOCUMENTS

CN 112214111 11/2021

*Primary Examiner* — Toan N Pham  
(74) *Attorney, Agent, or Firm* — PEARL COHEN LLP

(57) ABSTRACT

A method for providing location information of an object through touch via differentiation in stimuli between a plurality of somatosensory input points, the method comprising: receiving, by a processor, a spatial position of an object emitting said information; assigning, by the processor, for each of the plurality of somatosensory input points at least one of corresponding location characteristics of said object, based on a number of the plurality of somatosensory input points; determining, by the processor, for each of the plurality of somatosensory input points a corresponding location coefficient based on an intended panning angle surrounding a recipient of the plurality of somatosensory input points; determining, by the processor, a waveform based on a location characteristic of the object emitting the information; outputting via each of the plurality of somatosensory input stimuli that is experienced through touch based on its respective location characteristic and at least one of: location coefficient and the waveform.

12 Claims, 11 Drawing Sheets

(56) References Cited

U.S. PATENT DOCUMENTS

| | | | |
|---|---|---|---|
| 11,048,329 B1 * | 6/2021 | Lee | G06F 3/011 |
| 11,550,395 B2 * | 1/2023 | Beattie | G06T 7/40 |
| 12,373,033 B2 * | 7/2025 | Beattie | G06T 7/45 |
| 2013/0194402 A1 | 8/2013 | Amedi et al. | |
| 2015/0294597 A1 | 10/2015 | Rizzo | |
| 2017/0303052 A1 | 10/2017 | Kakareka et al. | |
| 2019/0378385 A1 * | 12/2019 | Biggs | H04R 1/1091 |
| 2021/0162457 A1 * | 6/2021 | Ebefors | G10K 15/00 |
| 2021/0333979 A1 | 10/2021 | Rockel et al. | |

* cited by examiner

Experiment 1 - group scores

Experiment 2 - group scores

Experiment 1

N=21

Experiment 2

N=16

TACTILE REPRESENTATION OF LOCATION CHARACTERISTICS AND CONTENT IN 3D

CROSS-REFERENCE TO RELATED APPLICATIONS

This application is a National Phase Application of PCT International Application No. PCT/IL2022/051258, International Filing Date Nov. 25, 2022, claiming the benefit of U.S. Provisional Application No. 63/283,236, filed Nov. 25, 2021, which are hereby incorporated by reference by their entirety.

TECHNICAL FIELD

The present invention relates to the field of representation of 3D location characteristics of an object through use of the touch sense.

DISCUSSION OF RELATED ART

The present invention relates to a method to reproduce spatial 3D-information from an object through touch, using a touch-motion algorithm (TMA) that translates virtual positions of moving auditory sources to tactile information using a number of actuators. The object may be a source of sound, audio sound, virtual or real, it may be radar, ultrasound, sonar, infrasound, for example. The present invention illustrates that humans are able to use TMA to reproduce 3D motion through touch with accuracy equal to auditory. The three-dimensional representation of space of the present invention via touch alone or in putative alignment with auditory and visual space, can solve a number of problems related to sensory dysfunction but also sensory augmentation in natural or virtual and augmented environments. In other implementations it can improve perception, learning and memory of complex environments. For instance, it can provide a means for enhancing the comprehension of speech for the hearing impaired or aid in speech comprehension in situations where the ability to hear is artificially impaired due to noise. This can provide a life-saving mode of communication in situations of exposure to occupational noise such as construction sites and military bases. In addition, the three-dimensional representation of space that is provided by the present invention can aid the visually impaired by providing them feedback regarding location characteristics and navigation in the immediate surroundings. Yet this is only the tip of the iceberg, as the present invention can be utilized for conveying other kinds of information as well in a curated manner, with possible implementations including but not limited to: localize sounds in locations that are not visible to a user such as the location of an incoming threat on an air force pilot; support the management of multiple simultaneous inputs (e.g. separate between various speakers in a group online conversation using location, or sounds of different medical devices in a noisy ER room), enhancing the perceptive encoding abilities of people learning foreign languages and spoken material through touch, conveying the emotions of people in the surroundings through touch to people on the autistic spectrum, conveying information regarding external time through touch to people suffering from circadian rhythm disorders, and more.

Sound to touch of the present invention includes the 3D spatial aspects of it which is crucial to the brain and hearing system.

SUMMARY OF THE INVENTION

The following is a simplified summary providing an initial understanding of the invention. The summary does not necessarily identify key elements nor limit the scope of the invention, but merely serves as an introduction to the following description.

Touch is generally not considered to enable 3D space perception (beyond the direct examination of objects), and current techniques conveying data through touch deliver only single dimensional data. Our system/method provides the first three dimensional representation of data in space.

The 3D representation is conveyed mainly through differences in frequency, latency, impedance, and amplitude of the tactile stimulus applied in different points of the body. As the 3D element is conveyed via modulation, the main signal is able to carry another layer of information. This is similar to how we perceive auditory information, with each ear receiving slightly different information. The same goes for the formation of a 3D visual image which we comprehend due to two slightly different images falling on both eyes (stereopsis).

Another layer of representing the location, is through modulation of the information signal based on its location, in an absolute sense, rather than in differentiation between two points (e.g. changing pitch according to height, or a low-pass filter to signals coming from behind). If comparing this to hearing, this is similar to the effects of the head related transfer function (HRTF).

Since the representation of space can be delivered via differentiation and modification, different sorts of data can be carried on the main signal and located in space. In other words, our invention represents augmented reality in touch.

Another meaningful aspect of the present invention, is that since our brains are capable of analyzing frequencies amplitude and latency in various parts of our body, it is possible to represent multiple layers of 3D space by utilizing different points of the body. Similarly, as it is possible to manipulate the relations between more than two points (unlike with the eyes or ears), it is potentially possible to represent more dimensions.

The present invention provides a method for providing location information of an object through touch via differentiation in stimuli between a plurality of somatosensory input points, the method comprising: receiving, by a processor, a spatial position of an object emitting said information; assigning, by the processor, for each of the plurality of somatosensory input points at least one of corresponding location characteristics of said object, based on a number of the plurality of somatosensory input points; determining, by the processor, for each of the plurality of somatosensory input points a corresponding location coefficient based on an intended panning angle surrounding a recipient of the plurality of somatosensory input points; determining, by the processor, a waveform based on a location characteristic of the object emitting the information; outputting via each of the plurality of somatosensory input stimuli that is experienced through touch based on its respective location characteristic and at least one of: location coefficient and the waveform.

Embodiments of the invention may provide that the location characteristic is at least one of angle; azimuth; elevation; distance; and spatial parameters.

Embodiments of the invention may include that the somatosensory input points are provided via a multi frequency actuator.

In some embodiments of the present invention, if said information is an integration of sound wave and location, the method further enhancing position and comprehension of audio.

Embodiments of the invention may include that the spatial position of the object is in cartesian coordinates, and further comprising converting the spatial position into spherical coordinates.

In some embodiments of the invention may include determining, by the processor, for each of the plurality of somatosensory input points a corresponding azimuth amplitude coefficient further comprises: if an angle between a particular somatosensory input point of the plurality of somatosensory input points and the intended panning azimuthal angle is greater than an angle between the particular somatosensory input point and an adjacent somatosensory input point, then the azimuth amplitude coefficient is zero, otherwise, the azimuth amplitude coefficient is based on the intended panning azimuthal angle, the position of the particular somatosensory input point, and the angle between the particular somatosensory input point and an adjacent somatosensory input point.

In some embodiments of the invention the waveform is a sawtooth wave with a frequency that is based on a minimum elevation and a maximum elevation.

In some embodiments of the invention the plurality of somatosensory input points are at least one of: fingers; chest; back; shoulders; wrists; ears, earlobes; and feet.

In some embodiments of the invention the plurality of somatosensory input points are multi frequency actuators.

In some embodiments of the invention wherein if the information is a sound wave, the method further comprises multiplying in a time domain the sound wave with waveform. Furthermore, if the information is integration of sound wave and location, the method further enhance the position and comprehension of the audio.

In some embodiments of the invention the audio source is in the ultrasound or infrasound frequency.

In some embodiments of the invention the method is used for enhancement capabilities of auditory localization.

A further aspect of the present invention provides a system for providing location information of an object through touch via differentiation in stimuli between a plurality of somatosensory input points, said system comprising: a processor configured for receiving a spatial position of an object emitting the information; the processor configured for assigning, for each of the plurality of somatosensory input points at least one of corresponding location characteristics of said object, based on a number of the plurality of somatosensory input points; the processor configured for determining, for each of the plurality of somatosensory input points a corresponding location coefficient, based on an intended panning angle surrounding a recipient of the plurality of somatosensory input points; the processor configured for determining a waveform based on a location characteristic of the object emitting the information; and at least one multi-frequency actuator configured for outputting via each of the plurality of somatosensory input stimuli that is experienced through touch based on its respective location characteristic and at least one of: location coefficient and waveform.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIGS. 3A and 3B are results of the experiments, according to some embodiments of the invention;

DETAILED DESCRIPTION OF THE DRAWINGS

Figure 1:
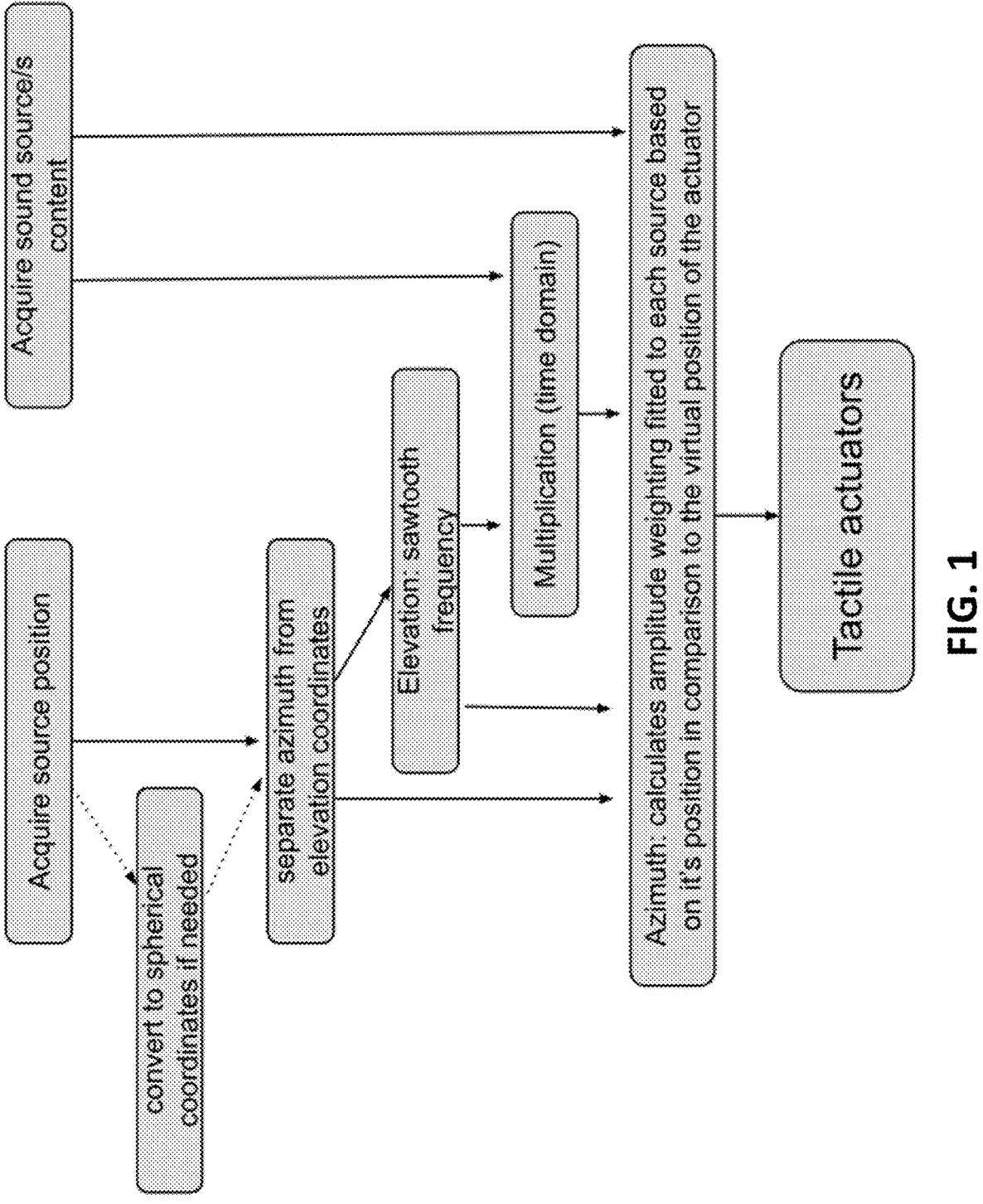
FIG. 1 is a flow diagram of the algorithm used in the present invention according to some embodiments.

Auditory is considered the only human sense capable of perceiving external locations in all angles of the three dimensional environment. This is distinct from the other senses. Vision, for example, has a much narrower frontal field of view (approximately 120° with no head movement; whilst touch is typically understood to refer to locations on the body and thus limited to the peripersonal space (space within which one can reach or be physically reached by other entities). The present inventors have discovered that the extrapersonal space (the space outside of reach) can be accurately represented through touch in a manner similar to that of hearing.

In auditory, localization of sources (static and moving) is a computational task occurring at various levels of the auditory system, starting as early as the olivary complex in the brainstem. In order to localize sound source positions, interaural comparisons are carried out, combining interaural level differences (ILD), interaural time differences (ITD), and spectral differences between the sounds arriving at the two ears caused by the interfering head shape, otherwise known as the head related transfer function (HRTF). The combination of these cues is used to create the binaural auditory model. Constant changes to the acoustic input positions, due to constant movement of both the listener and the surrounding sound sources, demand constant corrections to the interaural calculations in the auditory system which occur at extremely high speeds (approx. 50 microseconds). Precise sound source localization is also possible due to the high resolution of frequency (in the range of several Hertz) and intensity (in the range of several decibels) differentiation in the auditory system.

Fundamental similarities exist between the sense of touch and the sense of hearing, in that both have the ability to encode vibrations within a partially overlapping frequency range through the use of mechanoreceptors (specifically for the tactile sense, Pacinian corpuscles respond to vibrations up to 700-1000 Hz. In addition, the neural pathways of both the auditory and the vibration encoding tactile system converge through common or related brain networks (among others, the posterior part of the superior temporal lobe and the operculum on the border of the auditory and the somatosensory cortex). Both of these senses have also been referred to as "dynamic", as they are capable of encoding inputs in motion with high accuracy (as opposed to vision which is most accurate for detecting static inputs).

As such, the present invention can indeed occur based on a type of tactile "binaural" model using vibrotactile inputs delivered to the skin surface. It has been found that a time delay between the two sound inputs of the same intensity moved the locus of the sensation closer to the vibrator that received the input first, and that the latter was perceived louder. This indicated that a potential cue comparison mechanism for localisation might also exist in the tactile domain, similar to that employed by the auditory system. It has been further shown that intensity-differences (ILDs) can be used as cues for cutaneous localisation with much closer resolution to hearing than the temporal cues (ITDs) (with significantly poorer resolution for touch). It has also been shown that test tactile localisation of sources with the intent of inducing motion in the external space can be demonstrated. With two tactile buzzers in the frontal horizontal axis of 150°, it has been found similar accuracy of motion detection for both sensory modalities. The present invention shows that solely static, frontally oriented "binaural" tactile models have been studied thus far, and only with two actuators. Sources reproducing motion all around the head, as well as vertical variation have not yet been explored and are demonstrated in the present invention.

Conveying tactile information in a manner typically attributed to the auditory modality falls within the more general framework of sensory substitution (or sensory augmentation). Sensory substitution devices (SSDs) convey specific features typically provided by one sensory modality through a different one, based on learnable conversion algorithms. Specifically, audio-to-tactile SSDs have been utilized by the present inventors whilst others for conveying auditory speech frequencies through vibrations on the fingertips or wrists, to improve speech understanding in background noise are also demonstrated.

In accordance with embodiments of the present invention, the use of multiple input points of touch can be applied for a variety of uses, such as extenuating the effect by delivering the same input in multiple locations, locating the stimulation in specific locations on the body which associate to the represented information, or to a dimension in space (e.g., associate vibration on the extremities with further information). Furthermore, adding additional input points of touch can enhance the precision and resolution of space perception.

In accordance with embodiments of the present invention, representation of multiple layers of 3D space may be achieved by utilizing different input points of touch of the body.

Complementary locations may be used to represent complementary data (e.g., usage of 4 aligned actuators on the chest and back to represent a range of frequencies and another set of 4 aligned actuators under them to represent the extension of frequency range). This is an example and more or less actuators may be used as appropriate in different circumstances.

Similarly, as it is possible to manipulate the relations between more than two input touch points (e.g., unlike with the eyes or ears), representation of more dimensions beyond those of a 3D space may be obtained.

Some implementations may utilize unique localization features of different body parts and wearables. For example, providing of surround information using insoles containing multiple actuators, fingertips for high sensitivity, the ears, or behind the ears, allowing for integration with headwear and leveraging high sensitivity of these areas, and more.

The present invention creates an understanding of content and location of information and/or objects in 3d space by using vibrotactile inputs on the body. This 3D representation is conveyed through differences between two or more multifrequency actuators in frequency, latency, impedance, and amplitude of the tactile stimulus (just like differences in frequency latency and amplitude in differences between our two ears create an understanding of sounds in 3D). By performing such modulations it is able to create an understanding of content and location in 3D which is implicitly and automatically comprehended by the user.

The present invention is backed by three experiments employing a sensory augmentation system developed to further elucidate human tactile-based localisation capabilities and to show an integration between sound and touch.

EXAMPLES OF POSSIBLE IMPLEMENTATIONS OF THE PRESENT INVENTION

This is only an example of the azimuth of location and other characteristics are possible, such as distance, elevation, other 3-D spatial coordinates, etc.

First Implementation

Acquisition of Source Position

The first step is to acquire the spatial position of the object characteristic, and to fit it to spherical coordinates if needed. This can be done in various ways depending on the application. The technology may be paired with any technology capable of representing 3D spatial position as data (this would include microphone arrays, radar, sonar, virtual environments etc.). Once the information exists as data the coordinates are depicted separately: azimuth, elevation and distance.

Spatial Reproduction in Azimuth (Horizontal Field)

For the sake of clarity, assign 0° azimuth is assigned as the front center in relation to the individual's head, and higher numbers wrap around toward the right.

θ—The intended panning azimuthal angle surrounding the person which we would like to reproduce with the tactile plates.

n—The number of tactile actuators in the system.

$g_n$—The resulting amplitude coefficient for each actuator.

a—The virtual angle between adjacent actuators.

$l_n$—the virtual position (in degrees) on the azimuthal plane of a given actuator By default the azimuthal plane (360°) divided by the number of actuators gives the following equations:

$$a = \frac{360}{n} = |l_n - l_{n-1}|$$

For good left-right orientation $l_1$ is placed at half of the resulting angle from above with respect to azimuth position:

$$l_1 = \frac{a}{2}$$

$$l_n = \frac{a}{2} + a(n-1)$$

For instance with 4 actuators (two fingers of each hand or front and back of each shoulder): $l_1=45°$, $l_1=135°$, $l_1=225°$ and $l_1=315°$ the range of 360°, with 360°=0°, is always worked within and anything above 360 or below 0 is to be subtracted is fitted to that range.

If the angle between the actuator's virtual position and the intended angle to recreate is less than a:

$$\text{Then: } g_n = 1 - \sqrt{\frac{|\theta - l_n|}{a}}$$

Then the amplitude coefficient $g_n$ is calculated as such:

$$\text{If: } |\theta - l_n| \leq a$$

Otherwise the coefficient will remain at 0:

Else: $g_n=0$

As seen above, the difference between the virtual angle of the actuator and the angle which is to be achieved is divided, is the difference in virtual angle between adjacent actuators. The square root of this number is then subtracted from 1. Thus in every case two actuators are always active, their combined intensities allow reproduction of intermediate angles, and a linear change in the position induces motion.

In some cases, a gain minimum may be added in order to have the actuators very slightly active throughout—in other word the $g_n$ multiplier will be set to have a minimum between 0.05 to 0.2. If this is called minimum m, then $g_n$ will be mapped to a range between x and 1.

In such a case the $g_n$ coefficient may be calculated as such:

$$g_n = (1-m)\sqrt{\frac{|\theta - l_n|}{a}} + m$$

In a system in which the body parts equipped with the actuators are mobile, such as but not limited to hands or legs, tracking of motion can be used to facilitate online changes to the virtual positions of the actuators. Use of combining chest and lower body can be used to represent both azimuthal and elevation information in tandem using level mapping as indicated above with respective adjustments as appropriate in different circumstances.

Furthermore, in a system in which there is a vector based implementation for points moving in relation to the body (e.g., can be found in wearables, or controllers, etc.), more spatial information may be provided via less points.
Evaluation of this Implementation—Spatial Reproduction (Vertical Position/Polar Angle)

Elevation is an example of a location characteristic and this implementation may be similarly applied to other location characteristics with the required adjustments.

$\phi$—The elevation angle to be represented with regards to the person's head. Front and center is at $\phi=0°$.

When no auditory information is being given in the system (only position), then a reverse sawtooth wave at frequency $f$, is used, which changes in order to represent different angles of elevation.

The range of frequencies used is between 30 hz-740 hz (in accordance with the best frequencies for human tactile perception of vibration), and is mapped to an octave based logarithmic scale (as in music-using here just above 4.5 octaves, more exactly 55 semitones for the entire range) to the range of elevation which is of interest.

e—elevation within the chosen range.

To acquire e we do the following, where min and max refer to the maximum and minimum possible $\phi$ in the system respectively:

$$e = \frac{\phi - \min}{\max - \min} * 55$$

For instance-if the range of the system of the present invention is min=−25° and max=30° then if $\phi=5$ then e=30.

To find the frequency symbolic of the elevation $f_e$ to be emitted by the actuators, the following is carried out:

$$f_e = 2^{e/12} * 30 \text{ Hz}$$

using complex and/or "natural" sound sources

In order to add complex sounds into the device, the live/recorded sound sources to the vibration plates may be sent. This can be done to represent locations using location coefficient alone (cleaner sound-see Spatial reproduction in azimuth section), or by doing time domain multiplication of the wave of the sound source s with the sawtooth a waveform $f_e$ to incorporate further coordinates as well (see elevation section for more on $f_e$).

To better fit the sound to the capabilities of tactile detection in humans, the audio frequency range of s may be compressed by either spectral based frequency compression (more computationally heavy, digital, slower, but more accurate) or by taking audio filter bands (biquad or analog) and shifting the pitch of each band down by octaves, according to its distance from the fundamental.

Figure 4A:
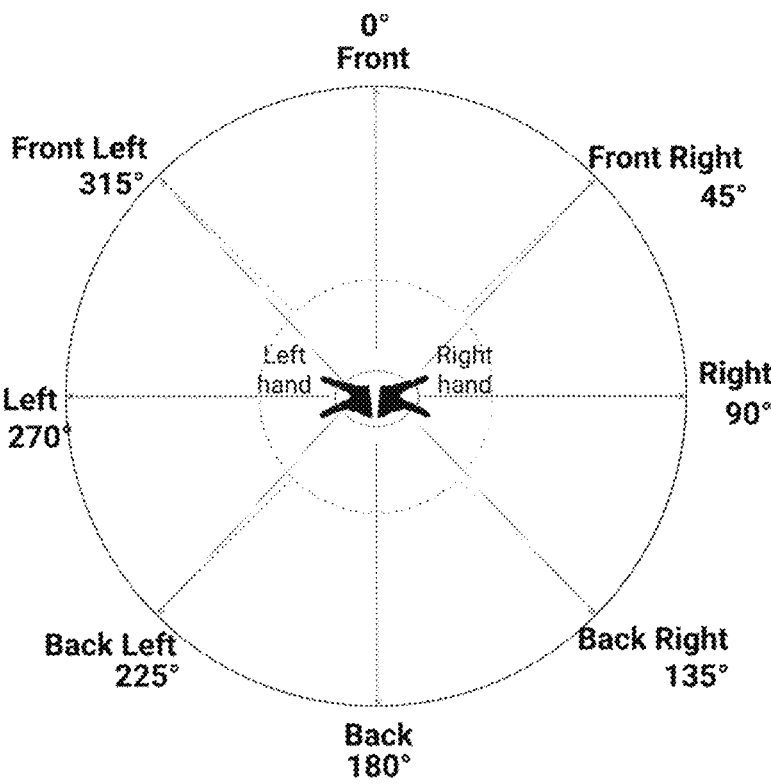
FIGS. 4A and 4B show two schematic diagrams illustrating an aspect according to some embodiments of the invention.

All of these techniques may be used separately or in tandem in order to arrive at a localized sound positioning and interaction depending fitted to the use case and the environment in which it is being used.
Evaluation
Apparatus: Tactile As shown in FIG. 4A two identical tactile devices, each containing two piezoelectric actuators, were used in all three experiments. In this particular example, to perceive the vibrations emitted by the piezoelectric plates, the person placed the first and middle two fingers of each hand into two holes on the side of a box of the device. Each finger was placed on a separate piezoelectric plate, which delivered complex vibrations (similarly to loudspeaker drivers) corresponding directly to the audio content. To ensure no sound leakage from the tactile stimulators, the devices were double-layered with acoustical foam within a heavy-duty cardboard box coated with fabric. Each box was powered through an amplifier and connected to an electrical socket.

The tactile algorithm decoding of the TMA was created in the Max MSP environment. Of course this is an example only and other means of transmitting vibrations can also be used.

The algorithm matches vibration level differences (among four vibration plates) in order to represent locations in the horizontal plane, or any other plane. As depicted in FIG. 1, each of the 4 fingers represented a diagonal orientation of the surrounding space (i.e. azimuthal 45°, 135°, 225° and 315°; the azimuthal front being at 0°). Of course, this is an example only and more or less plates can and may be used to represent location characteristic of the object, whether it be above, below, to the right or left. This particular example renders a 90° angle between the adjacent fingers (the homologue fingers of both hands, as well as the index and the middle finger of each hand). As an example, if both fingers of the right hand received vibrations of equal intensity, this indicated the right (90°) azimuth. At the same time, when only the middle finger of the left hand receives received inputs, this indicates a stimulus in the back left position (225°).

Figure 4B:
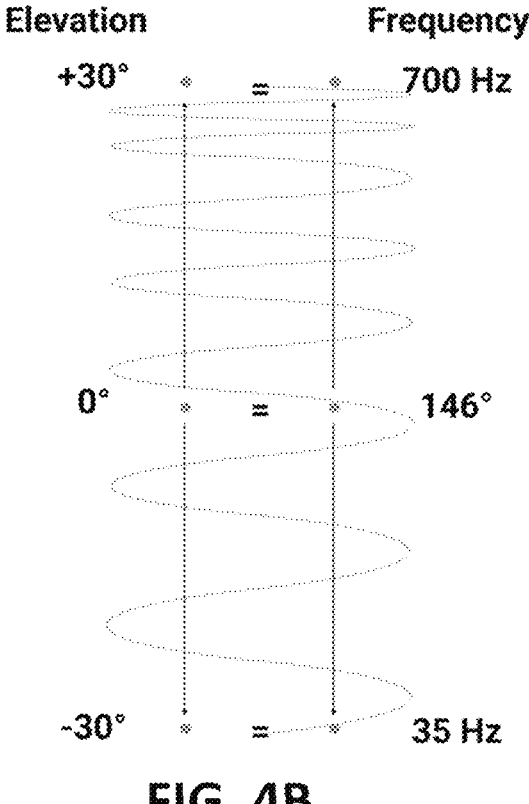

As shown in FIG. 4B, to represent horizontal locations of the stimulus through touch, the developed TMA algorithm compares the angle of the intended virtual source's position to the tactile actuator's intended diagonal angle, in order to define the gain differences among the four actuators. These gain comparisons changed as the source moved. Gain scaling of each actuator utilized a logarithmic amplitude scale.

Vertical positions of the "moving" stimuli between –30° and 30° were represented as changes in frequency. Specifically, the three levels were divided into three elevation ranges of 20° each (with regards to the participant's head position) which corresponded to three frequency subranges, scaled logarithmically in accordance with an octave pitch base: 1) the bottom level as 37-87 Hz, 2) the middle level as 88-233 Hz, 3) and the upper level as 234-622 Hz. The applied frequency ranges as well as the velocities of the "moving sources" were well perceivable through touch as vibrations (all below 700 Hz), as well as through hearing.

In experiment 1 the participants performed a task requiring localising moving sources through audition, directly followed by a corresponding task through touch; in Experiment 2 (in a different group of participants) a multisensory audio-tactile training session was embedded between the unisensory tasks to see whether it would affect the tactile performance; Experiment 3 consisted of a complex auditory scene where participants were tasked with identifying auditory object characteristics paired with "moving" tactile stimulation.

It is suggested that the findings herein indicate plasticity mechanisms taking place in the adult brain. In addition, the technique that has been developed carries potential for furthering the development of sensory assistive devices geared towards hearing impaired individuals (but also visually impaired), particularly those with conditions impairing auditory localisation, such as single-sided deaf individuals or cochlear implant users.

Evaluation Results

Experiments 1& 2

Same Localisation Accuracy Through Audition and Touch

In experiments 1 and 2, the participants were asked to identify the trajectory of motion of a moving stimulus. The results were arrived at by calculating the distance between the actual center point of the presented stimulus and the one obtained from the start and end points reported by the participant.

In Experiment 1 no statistically significant difference was found between the scores for the auditory (ME=0.75, IQR=0.11) and the tactile (ME=0.77, IQR=0.15) conditions (Wilcoxon signed-ranks test; p>0.05). This effect was further corroborated in Experiment 2 that also showed no statistically significant difference in performance between the auditory (ME=0.82, IQR=0.15) and the tactile (ME=0.82, IQR-0.16) test conditions (Wilcoxon signed-rank test, p>0.05). These results indicate that the participants performed the task of reproducing 3D spatial motion around the body using the sense of touch alone at the same level of accuracy as through audition. In fact, roughly half of the participants in both experiments were better in perceiving motion through touch.

Figure 2:
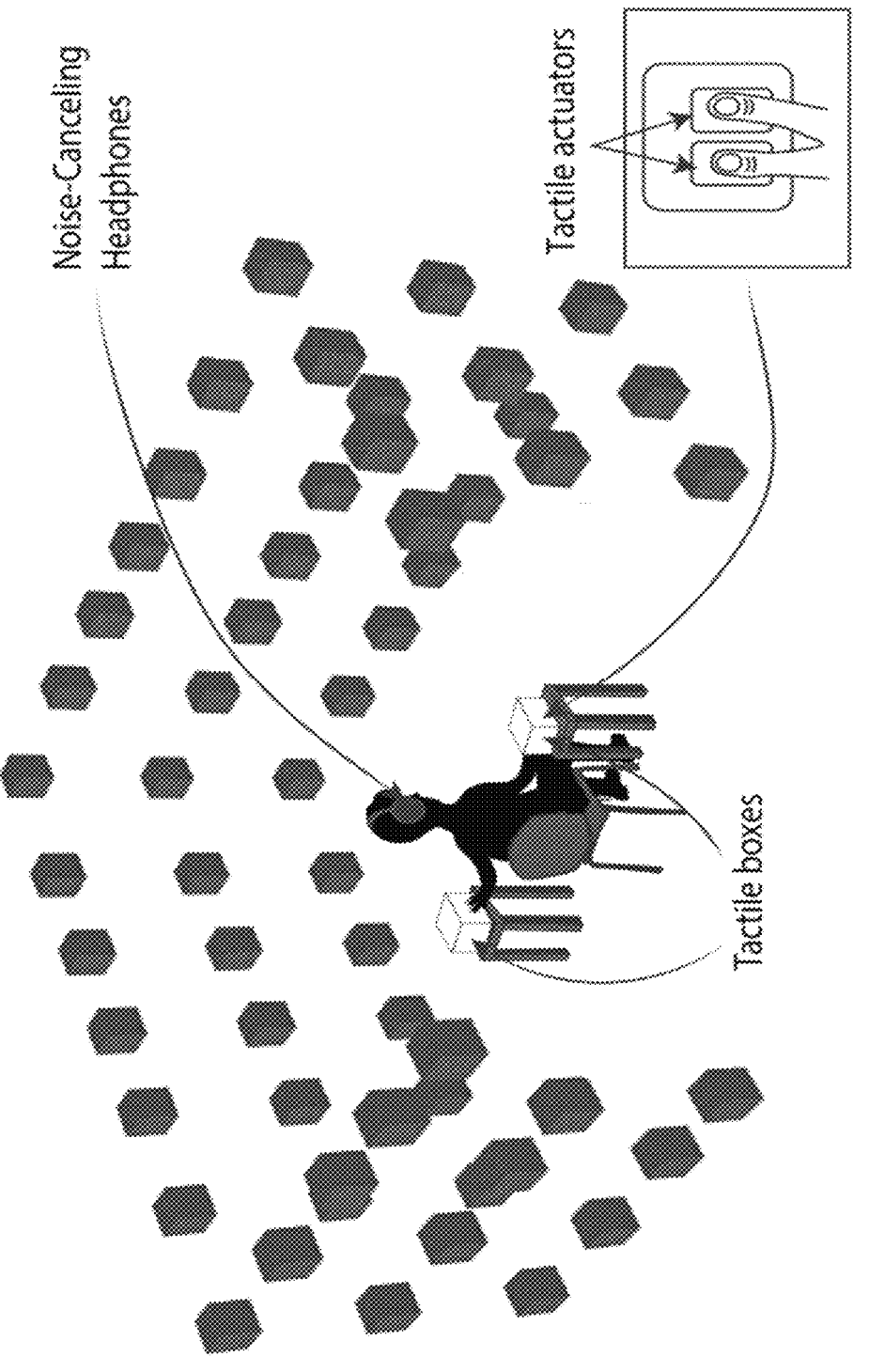
FIG. 2 is the experimental systems and set up according to some embodiments of the invention.
Figures 3A, 3B:
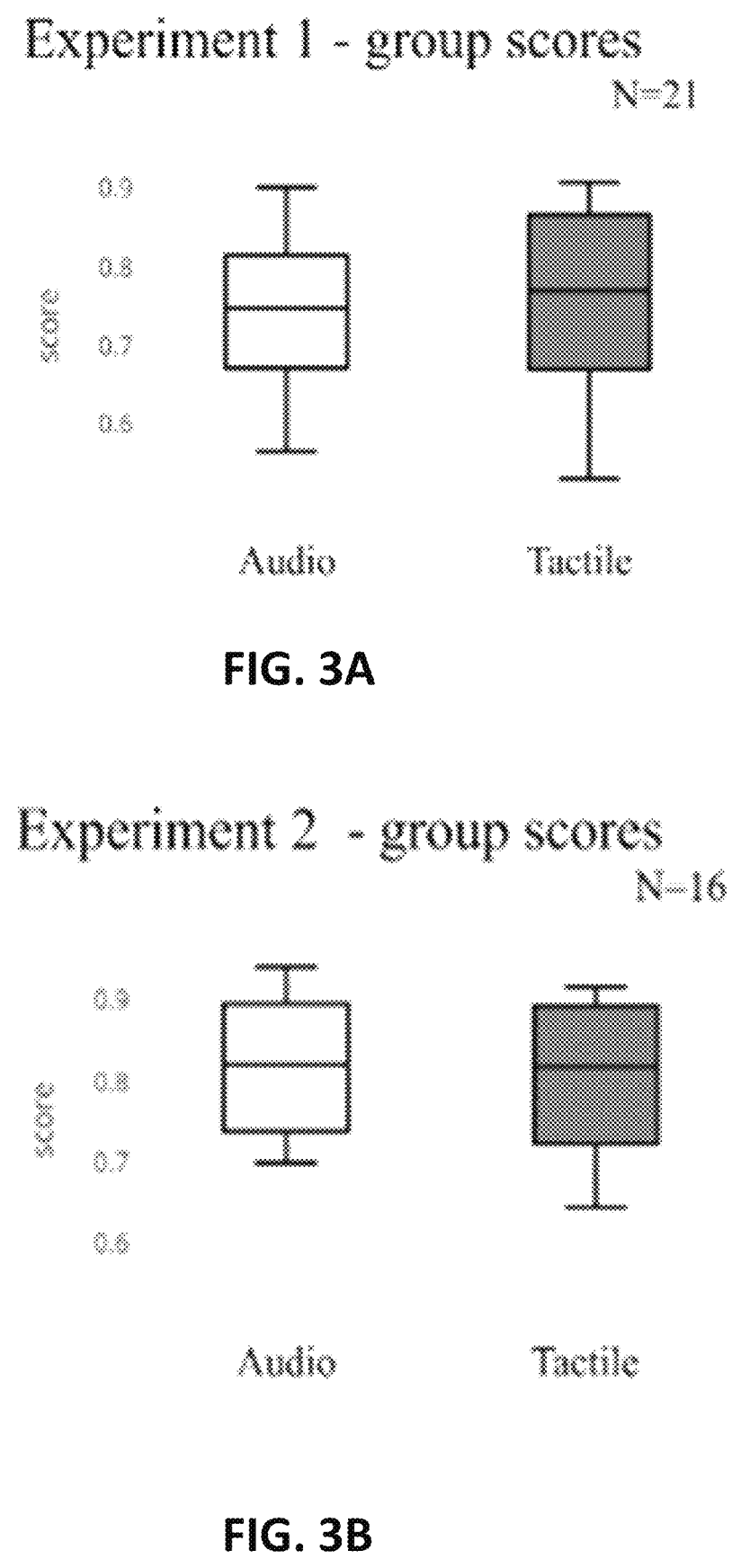

FIG. 2 represents experimental set-up and FIGS. 3A and 3B main results of Experiment 1 and Experiment 2. The participant was seated in the middle of a cubic sound-attenuated room with two fingers of both hands placed in two vibrating boxes on the sides of the body. During the audio condition, sounds were played from speakers mounted on the walls. Audio and vibrotactile stimuli were designed to induce perception of objects moving all around the subject. For the tactile stimuli, each finger corresponded to a corner location of the room and the intermediate "locations in space" were represented as gradual changes in vibration intensity. Elevation was represented as gradual changes in frequency. The 3D sound environment was a virtual sphere created using 12th order Ambisonics. The task of the participant was to report the start points, the end points and the direction of moving audio or tactile "objects". In Experiment 1 there were two study conditions, audio (only audio "moving" objects and their characteristics) and tactile (only tactile "moving" objects and white noise in the headphones). In Experiment 2 the participants had a short audio-tactile training between the audio and the tactile tasks. The scores were calculated based on the difference between the reported and the actual center points of the moving trajectories (between the start and end point, taking into account the direction). The results indicate same level of accuracy for the audio and the tactile conditions.

Figure 5A:
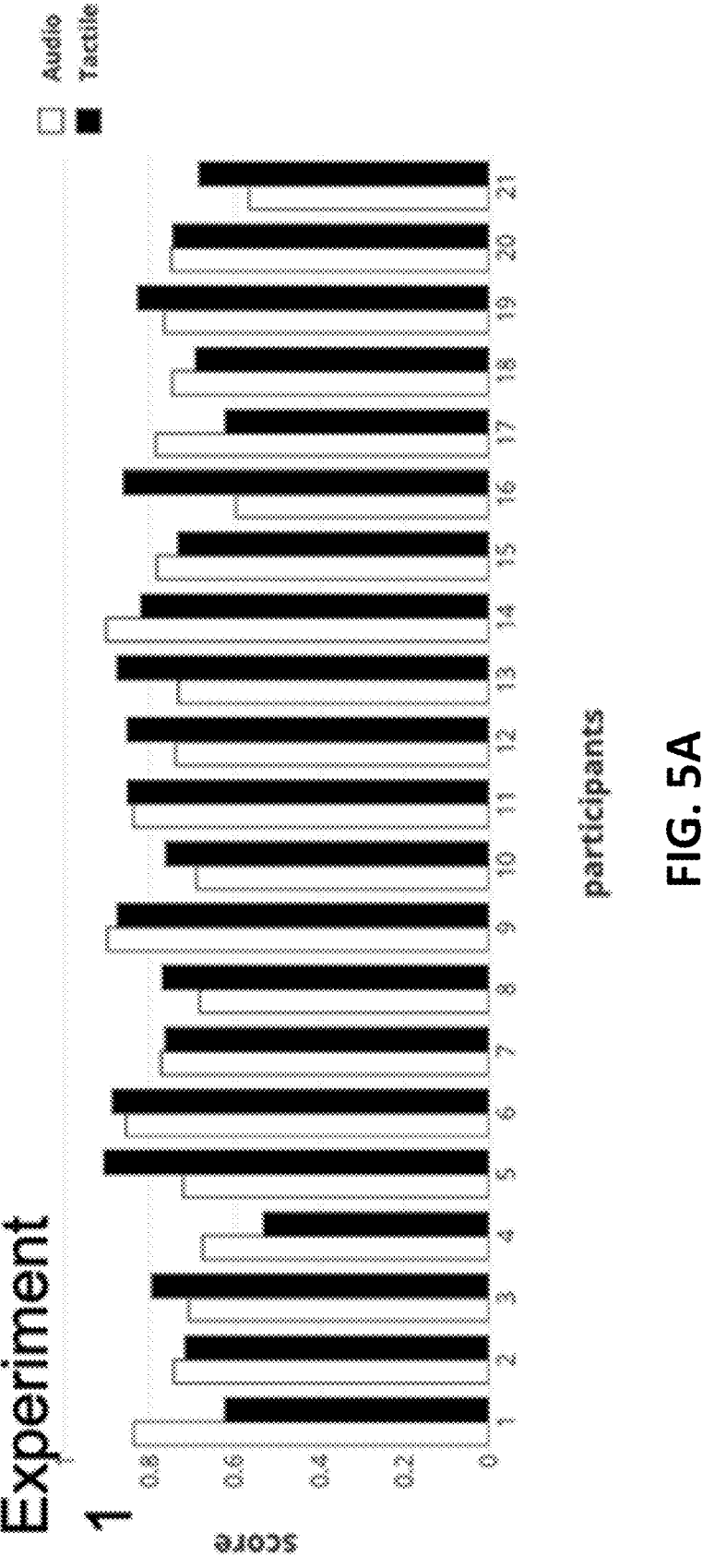
FIGS. 5A and 5B is a diagram illustrating the results according to some embodiments of the invention.
Figure 5B:
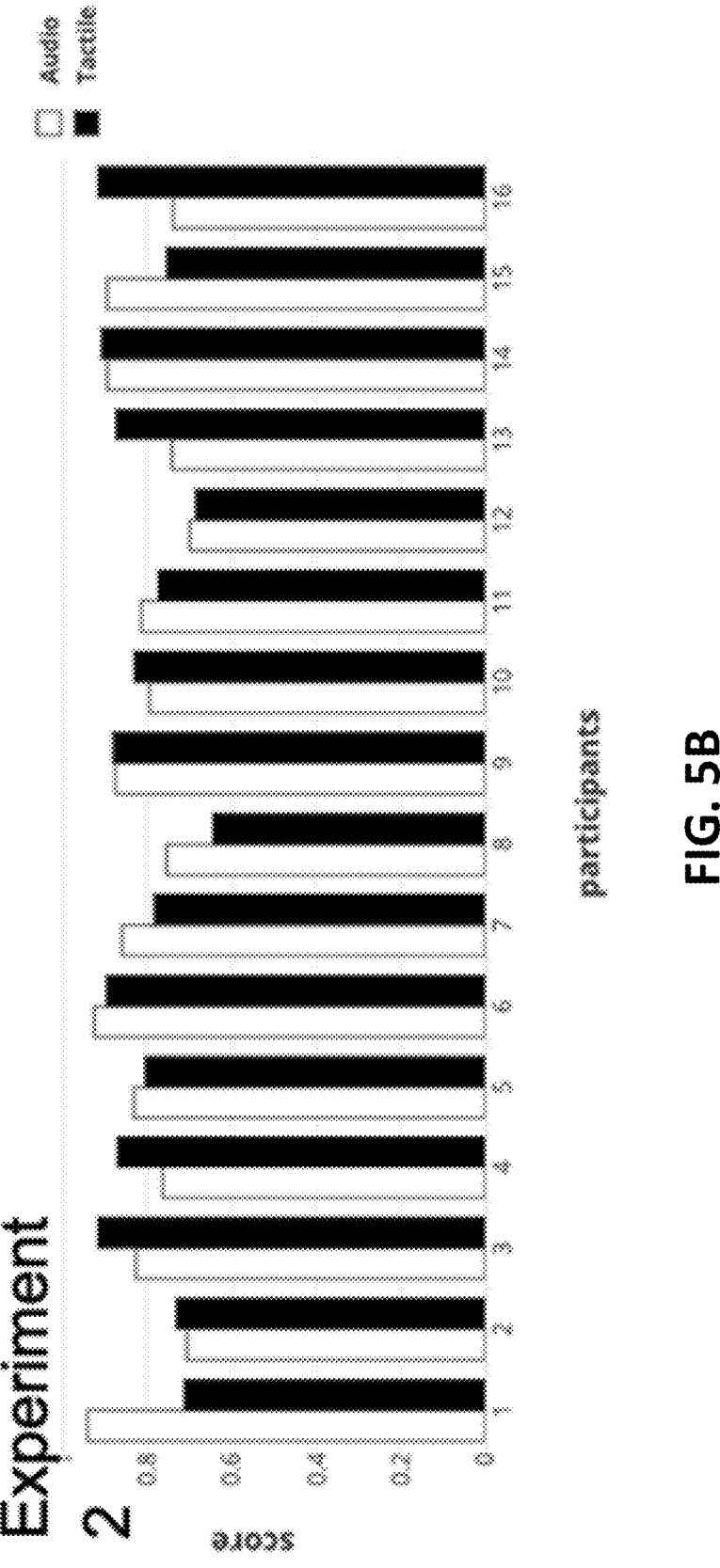

FIGS. 5A and 5B show individual participants' results in the task of localizing audio and tactile stimuli that induced perception of motion around the subject. The score is calculated based on the difference between the reported and the actual center point of the motion trajectory and is a combination of accuracy in reporting start, end points, and direction of motion. The results indicate that over half of the participants in both experiments had better accuracy in following trajectories of motion delivered through tactile inputs when compared to their performance in audio.

Improved Performance for Reporting Start Locations Through Touch

An additional analysis evaluating the accuracy of the reported start and end points specifically, revealed that participants in both experiment 1 and experiment 2 achieved higher scores when reporting start locations using the tactile modality, as compared to auditory. For experiment 1 the outcomes were the following: auditory start score ME-0.79, IQR-0.15, tactile start score ME=0.82, IQR=0.07 (Wilcoxon z=−1.95, p=0.05; medium effect size=0.31) and for experiment 2 the scores were: auditory start score ME-0.83, IQR-0.14, tactile start score ME=0.90, IQR=0.06 (Wilcoxon z=−2.33, p=0.02; small effect size=0.14).

In experiment 1 the scores obtained for reporting the start and the end points were equal internally for both sensory modalities (auditory start score: ME-0.79, IQR=0.15, auditory end score: ME-0.79, IQR=0.13, tactile start score ME=0.82, IQR=0.07 and tactile end score: ME=0.81, IQR=0.04; auditory start vs end score: z=−1.34, p=<0.05; tactile start vs end score: z=−1.25, p<0.05). At the same time, in experiment 2 the auditory performance was internally poorer with respect to reporting start vs end points (ME-0.87, IQR-0.126; z=−2.7, p=0.007, large effect size=0.87). Meanwhile, the tactile performance was internally better with respect to reporting start vs end points (ME=0.86, IQR=0.038; z=−2.7, p=0.007, large effect size=0.84).

Figure 6A:
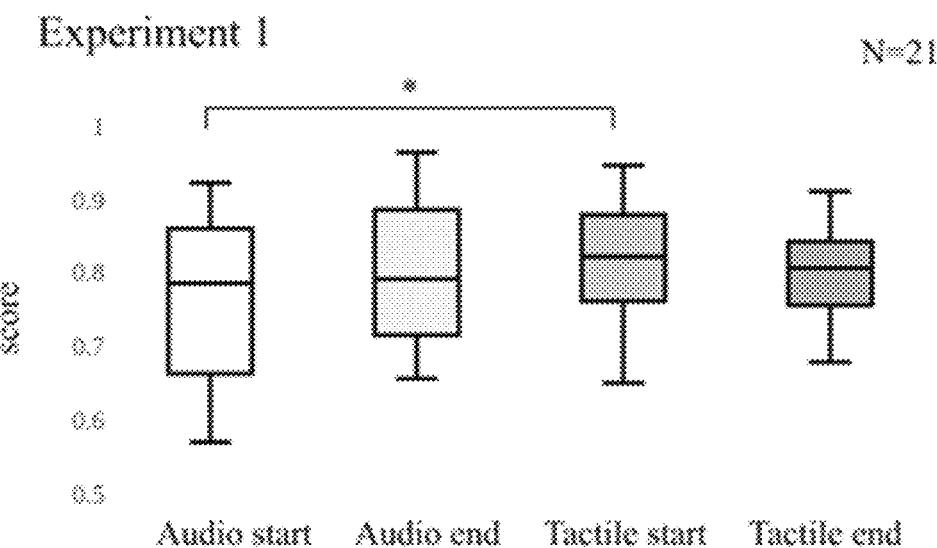
FIGS. 6A and 6B illustrate results of experiments 1 and 2 according to some embodiments of the invention.
Figure 6B:
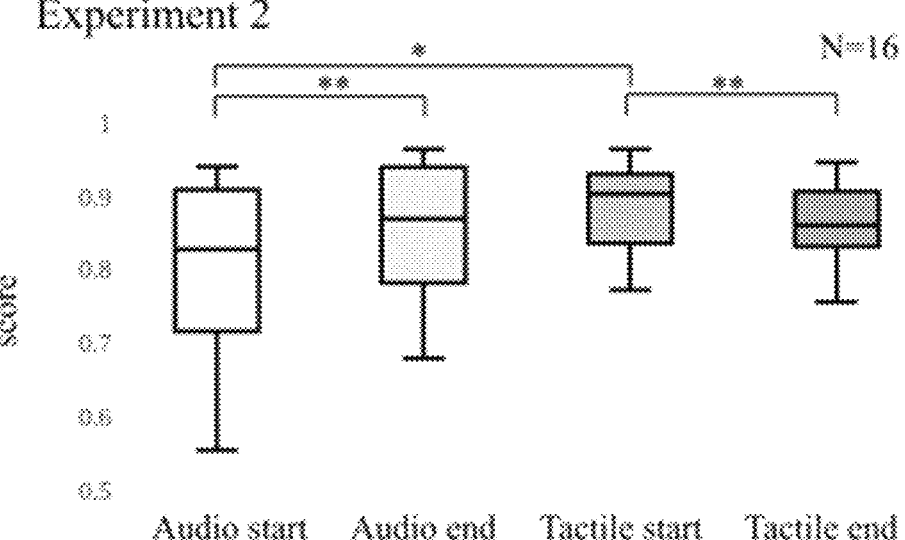

FIGS. 6A and 6B illustrate the participants' accuracy in reporting start and end points of the moving stimuli. The scores were calculated based on the distance between the reported points and the stimuli presented. The results of both experiments show better accuracy in reporting start points during the tactile condition in comparison with audio. In experiment 2, within the tactile modality, the participants had better accuracy for determining start vs end points. Within the audio modality, the accuracy was higher for end vs start points; *p<0.05, **p<0.01.

Figure 7A:
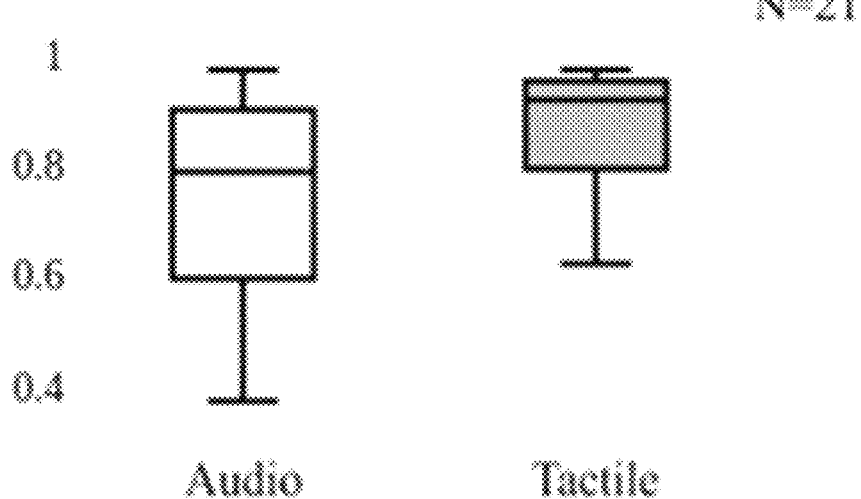
FIGS. 7A and 7B illustrates the results of the experiments according to some embodiments of the invention.
Figure 7B:
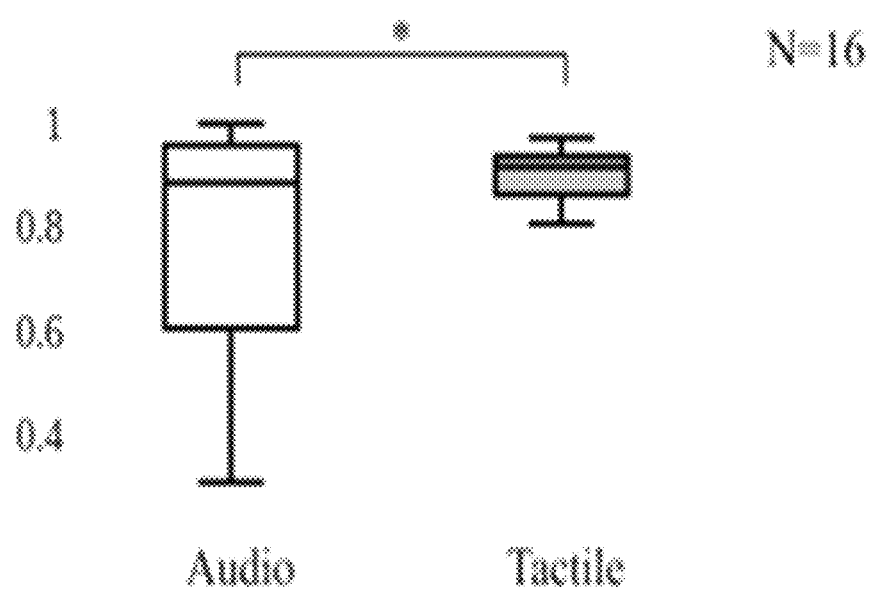

Higher accuracy for non-horizontally "moving" stimuli in tactile domain Two out of 14 objects were not moving in the horizontal axis and moving only in the vertical plane. In experiment 1 for these objects higher accuracy was reported in the tactile domain than in the auditory domain (ME auditory=0.85, IQR-0.18; ME tactile=0.94, IQR=0.24; Wilcoxon, Z=−2.49, p=0.013; medium effect size=0.39), with 88% of the responses correct across the 21 participants in the tactile and 42% in the auditory domain, respectively. In experiment 2 no such statistically significant effect was revealed between the two conditions but the scores were also higher for the tactile domain (auditory, ME=0.86, IQR=0.255; tactile, ME=0.92, IQR=0.075; p>0.05), with 84.4% of the responses correct in the tactile domain, 68.8% correct responses for audition). See FIGS. 7A and 7B for the results.

Some of the audio and tactile stimuli were only "moving" in the vertical axis (represented as changes in frequency) and were static horizontally. The results show that the accuracy (combined accuracy in determining start points, end points and direction) of reporting the trajectories of these stimuli was better in the tactile domain, as compared to the same task in audio.

Slightly Higher Accuracy for Right Vs Left Oriented Stimuli in Tactile Domain

The localisation abilities of the participants were also assessed with respect to subdivisions of the space surrounding them. The same "center point" approach was applied as for the general main results. In both experiment 1 & experiment 2 the scores for each of the four orientations were above chance.

In experiment 1 for the tactile domain, it was found a statistical effect showing better performance for the right-vs left-oriented stimuli (z=−1.96, p=0.05; medium effect size=0.46). Among the right-handed participants, 10/18 were better when reporting tactile inputs on the right side and one had equal scores for the right and the left-side orientation. Two left-handed participants had better scores for the right side when compared to the left: 0.81 vs 0.67, 0.80 vs 0.70, and the third person was equally good (0.89) in both modalities.

In experiment 2 the mean scores were also higher for the right vs left-oriented stimuli but the difference was not statistically significant (p>0.05), with half of the participants performing better on right-hand oriented stimuli (including one left-handed person). This effect may be related to the left brain hemisphere dominance for discrimination of tactile patterns or texture judgements, yet this warrants further investigation. No differences in accuracy were found between front vs back-oriented stimuli, in the tactile task.

For the auditory modality, there were no differences revealed when the motion reporting accuracy was compared between the right vs the left-oriented subfields, nor between the front and the back subfields (p>0.05). There was also no difference found in terms of performance between the two senses with respect to the 4 orientations.

Slightly better detection of motion direction in auditory domain With respect to reporting the correct horizontal direction of movement (clockwise vs counterclockwise vs static), the mean group percentage of correct answers in experiment 1 and experiment 2 was 73% and 76.6% for the auditory condition, and 64% and 72.9% for the tactile condition, respectively. This shows that while in experiment 1 the score was slightly superior in the auditory domain, no effect was found in experiment 2. It is speculated that this subtle effect might be related to situations such as for example, when a specific object (same start and end points) is moving either clockwise or anticlockwise. In such case the only difference between the two directions is that two index vs two middle fingers receive the intermittent fast-changing inputs.

Experiment 3

High Accuracy in Identifying Sounds Paired with "Moving" Touch

In experiment 3 the participants had to identify one out of four sounds embedded within a complex audio scene that were paired with "moving" vibrations delivered on their fingertips. The overall group mean score for all the participants averaged across the 4 sounds was M+/−SD−0.9+/−0.12, which was much higher than the chance level (0.25; with 1 indicating 100% accuracy for all sounds). When analysed separately, the scores for the 4 sounds were the following: a) OWL: M+/−SD−0.94+/−0.13, b) WOLF: M+/−SD−0.88+/−0.16, c) THUNDER: M+/SD−0.89+/−0.17; d) CRICKET: M=0.90+/−0.17). Planned paired t-test comparisons revealed that the participants were better at identifying the OWL than they were at identifying the WOLF (t=2.94, p=0.005; small/medium effect size=0.37). In addition, identification of the OWL was found to be slightly better when compared to THUNDER (t=2.348, p=0.022; p-value<0.05, small/medium effect size=0.35, uncorrected for multiple comparisons). It is speculated that the superior performance for the OWL sound was because of its fundamental frequency overlapping with the main frequency range encoded by the tactile receptors on the fingertips (200-300 Hz). Furthermore its regular rhythmical pattern may have made it easier to identify, in comparison to the other sounds.

Subjective Experience of the Participants

Experiments 1& 2

Twenty of the 21 participants in experiment 1 and all 16 participants of experiment 2 responded to the qualitative questions in the questionnaire.

In both experiment 1 and experiment 2, when asked what they heard during the tactile spatial localisation task (while wearing headphones emitting static white noise), several participants experienced some thought provoking bidirectional audio-tactile illusions. In experiment 1, one answer was indicative of the tactile vibrations inducing auditory experiences: participant 5—"I sometimes heard some small pitches that went along with the vibrations", another perceived the static white noise in the headphones as changing in levels: participant 6—"I heard vibration on my fingers and the waves of sound", and yet another suggested having an extrapersonal auditory experience: participant 11—"Sounds coming from different areas of the room".

In experiment 2, participant 5 said he " . . . visualized the touch as a moving object, kind of like a dot moving in the room.", which again may indicate that the vibrations became an extrapersonal experience, with Participant 10 reporting: "I heard a range of tones, from low to high or high to low etc. and the sound moved in waves", which suggests that the concurrent "moving" tactile stimuli might have induced a dynamic auditory experience.

Figure 9A:
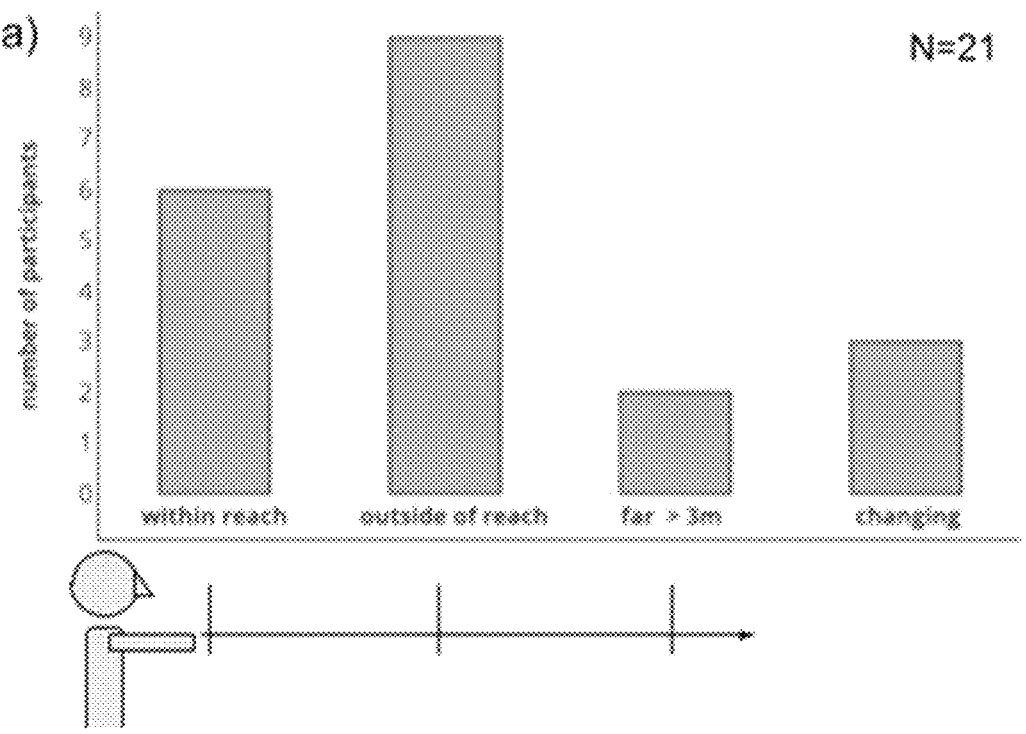
FIGS. 9A, 9B, 9C and 9D illustrates the results of the experiments according to some embodiments of the invention.
Figure 9B:
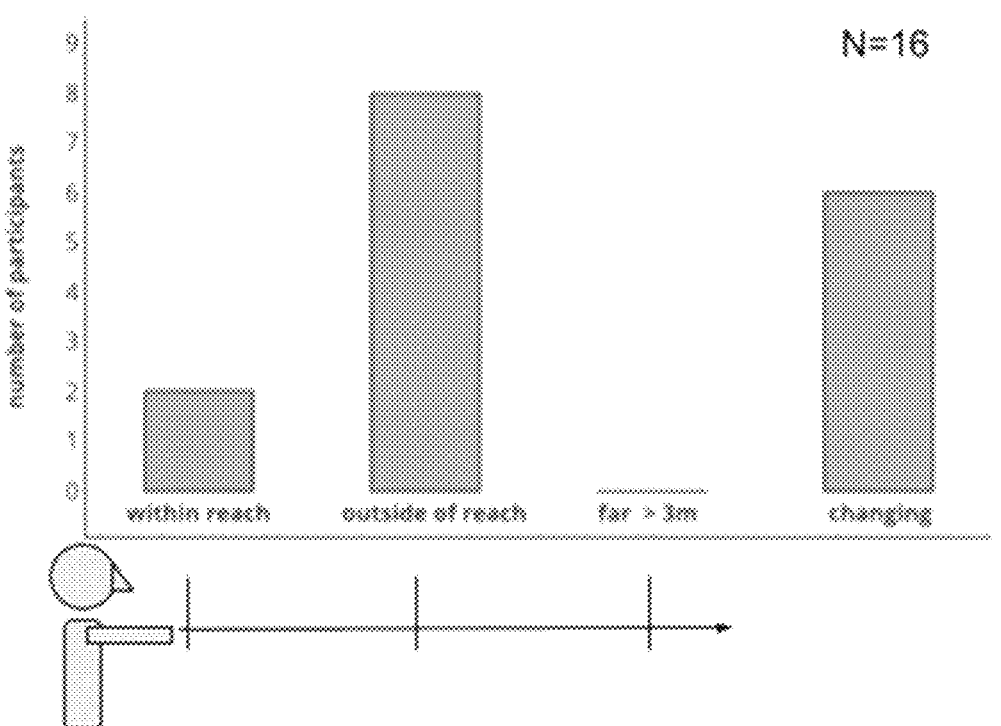
Figure 9C:
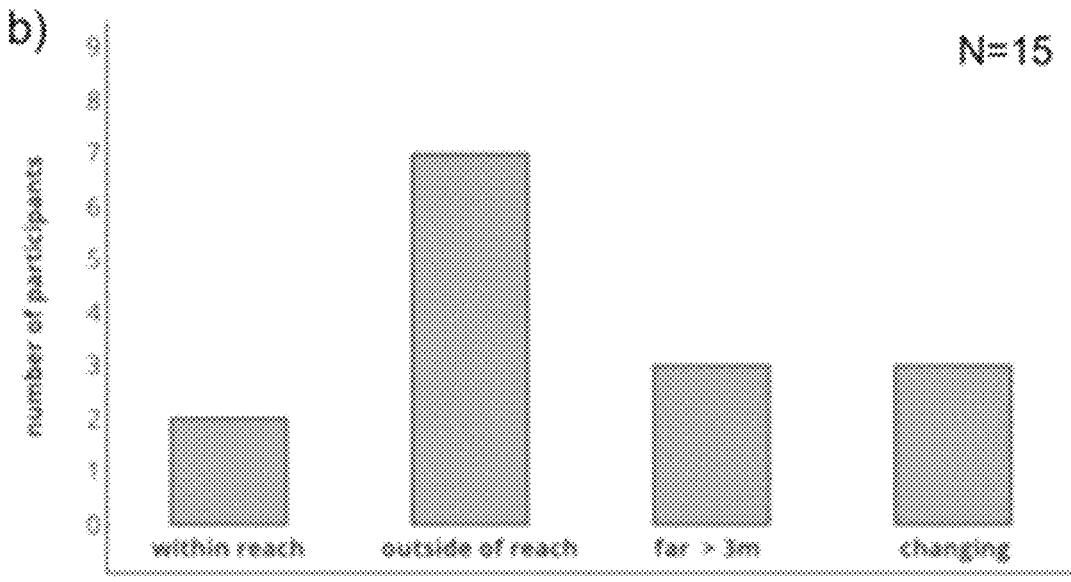
Figure 9D:
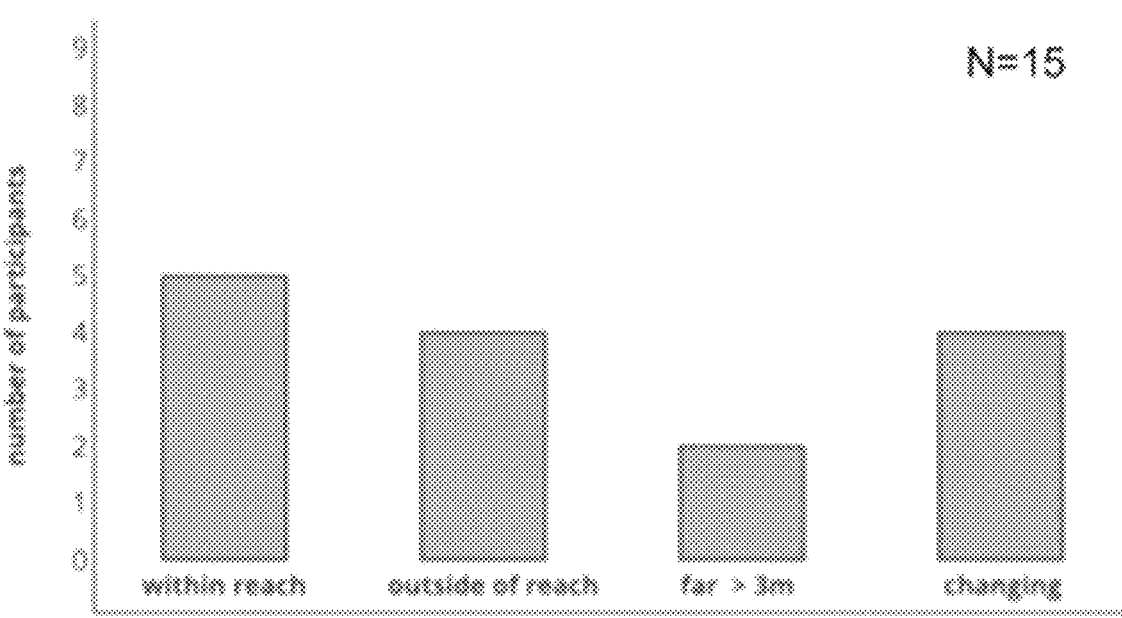

In the questionnaire, participants were also asked about the experienced distance between them and the vibrations/ "sounds" delivered during the tactile condition. The answers in Experiment 1 (N=20) and Experiment 2 (N=16) are depicted in FIGS. 9A and 9B.

Participants were asked about the perceived distance of the "moving" tactile (experiment 1 & 2), audio (experiment 1,2,3) or audio-tactile (only in experiment 3) stimuli. The respondents chose their response from among 4 categories: within reach, outside of reach, beyond 3 m, changing. The results indicate that most participants perceived the moving objects as beyond their reach, far, or changing in distance (including when they only perceived tactile vibrations on their fingertips).

In addition, 16 out of 20 (80%) participants in experiment 1 and 16/16 of the participants in experiment 2 said that they were visualizing the "moving sounds", while feeling vibrations on the fingertips (and wearing headphones with static white noise).

Experiment 3

The results of the questionnaire in experiment 3 also indicate a number of interesting phenomena concerning subjective experience of the participants. All of the asked 15 participants answered all the questions. Twelve out of 15 participants reported that the two sensory modalities felt connected to them during the experiment, with 8 (>50%) saying that the multisensory interaction increased the volume of the target sound, and 6 indicating that the sound was more prevalent/isolated/dominant when coupled with vibrotactile stimulation.

When asked whether the distance of the stimuli changed when the tactile inputs were added, 9/15 people felt that it did. Specifically, before vibrations were activated, 10 people indicated that the distance of the sound was "outside of reach" or "far", with 6 people reporting the same experience when the vibrations were present. Also, 5 people indicated that the sound felt "within their reach" when the vibrations were present, compared to only 2 who had indicated this before tactile inputs were added.

Finally, 8 out of 15 people reported that the combination of both sensory inputs (auditory and tactile) that they experienced in the room caused them to visualize the moving sources The participants were exposed to a complex combination of vibrotactile inputs that changed in velocity, frequency (for vertical cues), intensity (for horizontal cues) and/or sound identity (experiment 3). All of these elements were combined as inputs to four fingers in order to arrive at a single representation of complex motion. Despite the challenging nature of the task, the participants were able to successfully combine all the provided cues and use them for localisation of moving objects (the capability of the tactile system to combine different inputs on various body parts has been shown).

The main findings of experiment 1 & 2 show that tactile inputs per se can be used to represent spatial motion, and that participants are able to follow the moving trajectories with the same level of accuracy to that of the auditory system (also for all subfields of the space around the body analyzed separately, i.e. front, back, left and right). Interestingly, the multisensory audio-tactile training added in experiment 2 did not seem to have a large impact with respect to the tactile localisation results. This demonstrates that the reproduction of spatial motion may not be defined by a particular sensory modality. hypotheses are not patentable subject matter This finding has important implications for the development of rehabilitation techniques for the hearing impaired (but also visually impaired) who can be trained in spatial localisation using only touch or touch combined with audition.

Furthermore, carrying out a typical auditory task through the tactile modality while maintaining the same level of performance emphasizes the role of brain plasticity in adulthood as possibly more prevalent than previously assumed. This considering that participants learned a completely sensory task within a strikingly short period of time.

The tactile system, in addition to being as effective as the auditory system in the overall task performance of following motion trajectories, was actually found superior in two specific aspects. First, both in experiment 1 and in experiment 2 (medium and small effect size, respectively), the start points of the "moving" stimuli were slightly better reported through touch. This result is potentially related to the reduced accuracy for detecting start points of moving sources through hearing. While unlike the visual system, the auditory system allows for sound localisation in 360°, sound localization in healthy humans is understood to be learned through audio-visual interactions, using vision to pinpoint the exact sound source locations. It is shown here, based on the outcomes of experiment 3, that touch can be used for the same purpose, i.e. to callibrate auditory localisation.

Furthermore, experiment 1 (and there is a clearly similar indication in experiment 2) showed higher results for the tactile modality when the participants had to report the trajectories of the stimuli moving only in the vertical axis while stable horizontally. This is believed that this to be due to the generally reduced localisation accuracy in vertical as compared to horizontal localisations through the auditory system which may have caused an experience of apparent horizontal motion, even though none took place.

Experiment 3 was dedicated to testing the plausibility of using auditory-tactile interactions in more complex "real world" environments, that often include multiple sound sources in constant motion. This was done to account for the cocktail party effect, where selective attention and stream segregation would both be required for auditory perception The findings show that participants were able to make an instant connection between the tactile information received from TMA and the selected sound source with mean 90% accuracy, with no prior training whatsoever. Additionally, based on the questionnaire, most of the participants indicated that the feeling of sound and touch were indeed connected, and half said that the tactile inputs somewhat helped them localize the sound. This supports the showing that tactile information can increase the ability for spatial localisation through audition. The subjective benefit of adding tactile stimulation might have been due to several possible mechanisms (based on the answers of some of the participants), for example through the increased perceived loudness/dominance of the targeted sound object and/or enhanced concentration on the sound, when paired with concurrent vibrations.

In addition, half of the participants of experiment 3 experienced a shift in the distance of the moving sounds.

Another interesting phenomenon emerging from the participants' responses in all three experiments was that almost all of them (75% in experiment 1, and 100% in experiments 2&3) were visualizing their experience. It might have also been due to visualisation that a few participants of Experiments 1&2 felt that the static white noise in the headphones was changing in levels or movement. Meanwhile, visualization of auditory objects in motion has often been described as an almost automatic phenomenon. In addition, over one half of the participants perceived the tactile or audio-tactile inputs as occurring beyond their reach, far or changing in distance. The reported participants' experience in combination with the objective localisation results suggest that most subjects had an experience resembling that of auditory motion perception, i.e. one whose sources are located in the extrapersonal space.

During the experiment a 12th order Ambisonics setup was used for the generation of 3D audio at very high resolution.

Experiment 1

The Experimental Design

During Experiment 1 the participants took part in two test conditions: a) they listened to sounds "moving" in the space around them produced by the Ambisonics system (auditory condition; always came as first) and b) they were presented with vibrations on fingertips of both hands which represented "moving" locations in space (tactile condition). The tactile test was preceded by a short tactile training session (mean duration: 30.6+/−6.55 min). The tactile training included stimuli of a similar type to those used for the tactile test (see the Stimuli section for details). During training, the participants were given direct verbal feedback by the researcher about their answers and allowed to request stimuli to be repeated multiple times. The training session was divided into three subsequent sections, with the stimuli: 1) moving only along the horizontal axis, 2) moving only along the vertical axis, 3) combining motion on both axes. One dedicated sheet with a set of stimuli was used for the training session in all participants (this sheet was never used in the test session). In order to proceed to the subsequent section of the training, the participants had to provide 3 correct answers in a row. The training was ongoing until this criterion was met. Participants had their eyes open during the entire duration of the experiment and could move their heads freely. During the tactile condition, to ensure that the tested person did not perceive any external sounds, participants were asked to wear noise-canceling headphones (Bose QC35) emitting static white noise at a comfortable level.

The Stimuli

The stimuli were constructed of sawtooth waves in the frequency range between 37 Hz-622 Hz, for both auditory and tactile test conditions. This range of frequencies was chosen to ensure that the stimuli are perceivable through vibrotactile receptors on fingertips. Changes in frequency between the stimulus' start and end point were carried out in a linear fashion (musical glissando), in order to maintain an impression of linear motion rather than stepwise jumps. Tactile horizontal positions were given using combined level differences of the four tactile actuators, with gradual changes in level weighting in order to recreate "motion".

There were 14 stimuli used in both test conditions (auditory and tactile), and each stimulus was 4 seconds in duration. Before the experiment, two different sets of stimuli were automatically generated for each person using a pseudo-randomizing algorithm, from 9 optional sets. It was ensured that the stimuli are equally distributed in terms of both their azimuthal orientation (defined by the horizontal center point of the motion), their velocity (moving across a certain number of horizontal and vertical positions), and the direction of motion (clockwise vs counterclockwise, and upward vs downward) for all test sheets.

The table below presents all parameters of the stimuli:

TABLE 1

| Group median scores in experiment 1 & 2, with respect to the orientation around the body. | | | |
|---|---|---|---|
| Condition | Front | Back | Right | Left |
| Experiment 1 | | | | |
| Auditory | ME = 0.75, IQR = 0.25 | ME = 0.81, IQR = 0.22 | ME = 0.74, IQR = 0.25 | ME = 0.79, IQR = 0.11 |
| Tactile | ME = 0.79 IQR = 0.16 | ME = 0.82 IQR = 0.18 | ME = 0.81 IQR = 0.20 | ME = 0.76 IQR = 0.22 |
| Experiment 2 | | | | |
| Auditory | ME = 0.84 IQR = 0.13 | ME = 0.86 IQR = 0.16 | ME = 0.86 IQR = 0.09 | ME = 0.86 IQR = 0.13 |
| Tactile | ME = 0.86 IQR = 0.12 | ME = 0.80 IQR = 0.22 | ME = 0.88 IQR = 0.09 | ME = 0.86 IQR = 0.22 |

The Task

The participant gave a verbal response after each stimulus, by identifying the start and the end point of the moving source (both in terms of its horizontal and vertical position), as well as the horizontal direction of motion (clockwise, counterclockwise or static). The stimuli in both conditions were referred to as "sounds" when the participants were instructed before the task. Each participant was given a response sheet indicating all possible locations. An example possible response of the participant could be that the sound started in the "front . . . [0° horizontal] . . . up [30° vertical]" position, and moved counterclockwise towards the "back-left . . . [225° horizontal] . . . middle [0° vertical]" position.

Following the localisation test, the participants were asked to respond to a short questionnaire pertaining to their subjective experience during the tactile condition.

Experiment 2

The Experimental Design

In experiment 2, in addition to the two unisensory test conditions in Experiment 1 (auditory and tactile), the subjects participated in an auditory-tactile training session, combining sounds "moving" in the space around them and vibrations on 4 fingertips. The training session was 30+/11.8 minutes in duration. The auditory-tactile training was designed in the same way as the tactile training preceding the T test in both experiment 1 and experiment 2, but the stimuli were all multisensory.

Experiment 3

The Experimental Design

Figure 8:
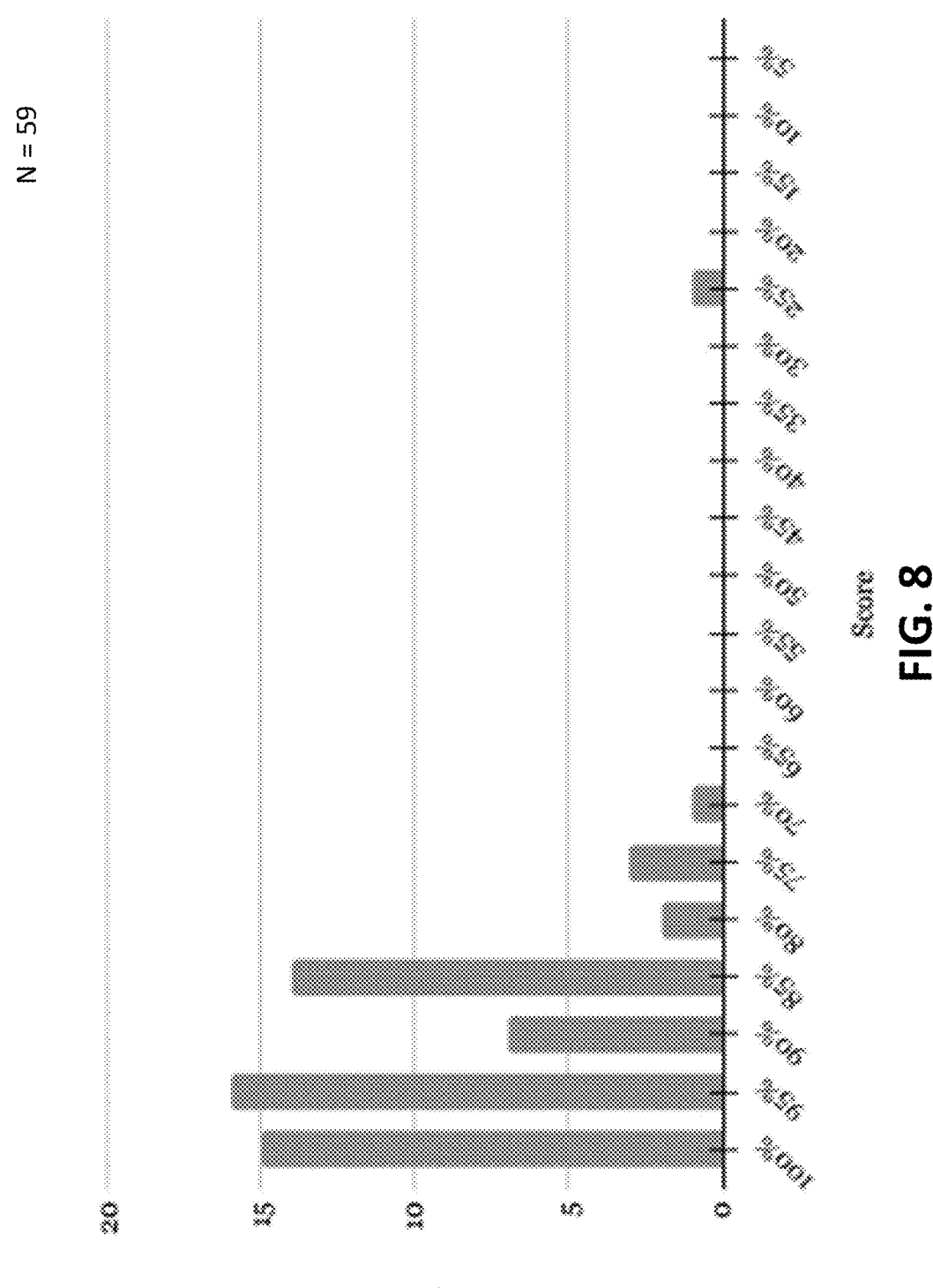
FIG. 8 illustrates the results of the experiments according to some embodiments of the invention.

In the same manner as in experiment 1 and experiment 2, each participant was seated in the center of the experimental room (see Experimental setup) with 4 fingers placed in two tactile devices. They experienced a complex auditory scene consisting of 8 ecological "forest" sounds, all of which were moving throughout the scene for the whole duration of the experiment in both the horizontal and vertical axes. Sounds could be located anywhere in the azimuthal plane (360°) and between −30° and 30° in elevation. All target sounds were constantly moving at a slow rate with random trajectories. Four sounds served as environmental background sounds, while 4 served as possible targets to be paired with vibrotactile stimulation on the fingertips. The latter were: 1) owl 2) wolf 3) thunder 4) cricket (see spectrograms in Figure S2 in Supplementary Materials). Other sounds in the environment included rain, various bird sounds, as well as two general ambient environmental soundtracks. See FIG. 8.

The Stimuli

After listening to the auditory scene for a duration of 2-10 seconds, one of the four target sounds was paired with tactile stimulation for 10 seconds, in synchrony with the audio content and its spatial position. The tactile stimulation could only coincide with one single target sound at a time. After 10 seconds, the scene was paused (both the audio and the tactile) and the participant was asked to provide a verbal response. They had to select one of the four possible target sounds using a sheet containing their names (a four-alternative forced choice paradigm). Once the response was recorded, the scene was un-paused and a new tactile coupling took place immediately afterwards.

The Task

Each person participated in one trial consisting of 20 stimuli, whereby each of the four target sounds was paired with the tactile input five times in the trial, in a different pseudo-random order for each participant. After the end of the experiment, 15 participants chosen at random were also given a questionnaire pertaining to their subjective experience.

The present invention allows for a wide variety of capabilities applicable in various applications in different fields. Some of these abilities include the creation of differentiation between multiple sources and types of information (helping with overload of data inputs, or data that is difficult to differentiate such as multiple simultaneous sounds), improving response time to crucial information conveyed, and specifically location related information. All of these can be used for supporting those with difficulties (be it due to environmental or physiological limitations), or for enhancing and even enabling the implicit and automatic comprehension of information which is normally not perceivable by the user's senses. Furthermore it can be used to represent any artificial data in 3D space without hampering our visual and auditory abilities. In many cases our understanding of the location and content of sounds in the 3D world is limited. This can be the result of noise and sensory overload (like in the famous cocktail party effect when there are several sound sources, and we need to focus only on one of them-a speaker in front of us or a pilot trying to locate the source of a sound in a very noisy environment; another example is to understand speech in a noisy environment which is dramatically hampered). This can also result from deficits in our auditory or visual channels, or from overload of the visual and auditory channels. The current invention solves this problem by providing the information in 3D via the sense of touch— as a standalone or for supporting the content and location of auditory or visual information (like the content and location of speech from someone or some channel in an extremely noisy environment). Adding tactile interfaces also enhances second language perception. Thus, the present invention may improve understanding of second language speech, which represents another low signal to noise situation. In addition, the cocktail party effect and accompanying challenges are even worse in second or non-native language.

Another use for this invention could be in enabling auditory-like localization for those unable of, or with flawed auditory localization ability, such as cochlear implant users or those suffering from single sided deafness. This can be done either with a device which represents special sounds in touch in real time use, or by a manner of training on audio localisation via a mixed sensory modality in order to improve one's ability to localize sound also without the tactile device following training.

This method can also be applied for enhancing the abilities of those with fully functional hearing, both with a real-time use device or via training for enhancing abilities. This is achieved to the enhanced effect of multi-sensory input as well as the ability to deliver highly extenuated information normally difficult to perceive by audition, as differentiation in height.

The present invention could have another advantage in conveying information specifically to those suffering from various suboptimal mental states (such as ADHD). As recent studies showed, these populations may suffer from a lowered ability to integrate between senses. This method of direction of ones attention can also be used for attention based treatment for anxiety relief, relaxation, pain management, claustrophobia relief, and more.

In a similar manner, the invention can be used for presenting external rendering of internal states through 3D touch which could be incorporated in biofeedback guided systems for reducing stress, anxiety, chronic pain, depression, claustrophobia, and more.

The ability to direct attention without competing with the auditory and visual senses, while also conveying information, can be useful for high critical cases such as military applications, or transportation, where an airforce pilot or infantry soldier could be informed of threats using tactile stimuli, or a driver of an autonomous vehicle could be notified of possible collisions or threats via an available sensory channel, include the location of the threat lowering response times, and perhaps even carry meaningful information regarding the threat itself.

This invention allowed for several applications relying on the ability to convey multiple layers of information, or information not normally perceived by the senses. Such applications could include localized "Super hearing", by encoding non auditory frequency sounds as vibratory inputs, thus complementing the human hearing range beyond it's approx range of 20 to 20,000 Hz, with frequencies sech as those audible for dolphins and bats (up to 100,000 Hz) or elephants (14-16 Hz) and whales (7 Hz in water). This ability would enable sensing things such as the flight of a bug, a leaf falling from a tree, etc. Tested implementations have encoded low frequency sounds as vibratory inputs, thus complementing the human hearing range. Similar to the extension of perceived frequency range, this invention could be used to extend the human visual field of view beyond 210 degrees up to 360° through vibration. This invention can be used for enhancing the realism of touch-based interactions in immersive environments as XR.

The invention claimed is:

1. A method for providing location information of an object through touch via differentiation in stimuli between a plurality of somatosensory input points, the method comprising:

receiving, by a processor, a spatial position of an object emitting said information;

assigning, by the processor, for each of the plurality of somatosensory input points at least one of corresponding location characteristics of said object, based on a number of the plurality of somatosensory input points;

determining, by the processor, for each of the plurality of somatosensory input points a corresponding location coefficient based on an intended panning angle surrounding a recipient of the plurality of somatosensory input points;

determining, by the processor, a waveform based on a location characteristic of the object emitting the information;

outputting via each of the plurality of somatosensory input stimuli that is experienced through touch based on its respective location characteristic and at least one of: location coefficient and the waveform; and determining, by the processor, for each of the plurality of somatosensory input points a corresponding azimuth amplitude coefficient;

wherein, if a first angle between a particular somatosensory input point of the plurality of somatosensory input points and an intended panning azimuthal angle is greater than a second angle between the particular somatosensory input point and an adjacent somatosensory input point, then the azimuth amplitude coefficient is zero, otherwise, the azimuth amplitude coefficient is based on the intended panning azimuthal angle, the position of the particular somatosensory input point, and the second angle between the particular somatosensory input point and the adjacent somatosensory input point.

2. The method of claim 1 wherein the location characteristic is at least one of angle; azimuth; elevation; distance; and spatial parameters.

3. The method of claim 1 wherein the somatosensory input points are provided via a multi frequency actuator.

4. The method of claim 1 wherein the spatial position of the object is in cartesian coordinates, and further comprising converting the spatial position into spherical coordinates.

5. The method of claim 1 wherein the waveform is a sawtooth wave with a frequency that is based on a minimum elevation and a maximum elevation.

6. The method of claim 1 wherein the plurality of somatosensory input points are at least one of: fingers; chest; back; shoulders; wrists; ears; and feet.

7. The method of claim 1 wherein the plurality of somatosensory input points are multi frequency actuators.

8. The method of claim 1 wherein if said information is an integration of sound wave and location, the method further enhancing position and comprehension of audio.

9. The method of claim 1 wherein the audio is in the ultrasound or infrasound frequency.

10. The method of claim 1 wherein if the information is a sound wave, the method further comprises multiplying in a time domain the sound wave with waveform.

11. The method of claim 1 wherein the method is used for enhancement capabilities of auditory localization.

12. A system for providing location information of an object through touch via differentiation in stimuli between a plurality of somatosensory input points, said system comprising:

a processor configured for receiving a spatial position of an object emitting the information;

the processor configured for assigning, for each of the plurality of somatosensory input points at least one of corresponding location characteristics of said object, based on a number of the plurality of somatosensory input points;

the processor configured for determining, for each of the plurality of somatosensory input points a corresponding location coefficient, based on an intended panning angle surrounding a recipient of the plurality of somatosensory input points;

the processor configured for determining a waveform based on a location characteristic of the object emitting the information; and at least one multi-frequency actuator configured for outputting via each of the plurality of somatosensory input stimuli that is experienced through touch based on its respective location characteristic and at least one of: location coefficient and the waveform; and the processor configured for determining, for each of the plurality of somatosensory input points a corresponding azimuth amplitude coefficient;

wherein, if a first angle between a particular somatosensory input point of the plurality of somatosensory input points and an intended panning azimuthal angle is greater than a second angle between the particular somatosensory input point and an adjacent somatosensory input point, then the azimuth amplitude coefficient is zero, otherwise, the azimuth amplitude coefficient is based on the intended panning azimuthal angle, the position of the particular somatosensory input point, and the second angle between the particular somatosensory input point and the adjacent somatosensory input point.

* * * * *